(12) United States Patent
Daniel (10) Patent No.: US 9,073,137 B2
(45) Date of Patent: Jul. 7, 2015

(54) WORK CURRENT SWITCHING TO ELIMINATE ARC BLOW

(75) Inventor: Joseph A Daniel, Sagamore Hills, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 452 days.

(21) Appl. No.: 13/411,455

(22) Filed: Mar. 2, 2012

(65) Prior Publication Data

US 2013/0228558 A1   Sep. 5, 2013

(51) Int. Cl.
| B23K 9/10 | (2006.01) |
|---|---|
| B23K 9/06 | (2006.01) |
| B23K 9/08 | (2006.01) |
| B23K 9/025 | (2006.01) |
| B23K 9/09 | (2006.01) |

(52) U.S. Cl.
CPC . *B23K 9/08* (2013.01); *B23K 9/025* (2013.01); *B23K 9/09* (2013.01)

(58) Field of Classification Search
CPC .......... B23K 9/091; B23K 9/025; B23K 9/09; B23K 9/08
USPC .................................................. 219/130.21
See application file for complete search history.

(56) References Cited

U.S. PATENT DOCUMENTS

| 4,020,320 A * | 4/1977 | Pijls et al. ................ 219/137 PS |
|---|---|---|
| 7,060,935 B2 * | 6/2006 | Stava ........................ 219/130.51 |
| 7,193,176 B2 * | 3/2007 | Potts et al. .................... 219/132 |
| 2003/0062355 A1 * | 4/2003 | Ikegami et al. ......... 219/137 PS |
| 2013/0200054 A1 * | 8/2013 | O'Donnell et al. ........ 219/130.1 |

FOREIGN PATENT DOCUMENTS

| JP | 55139179 A | * 10/1980 | ............... B23K 9/08 |
|---|---|---|---|
| JP | 56059581 A | * 5/1981 | ............... B23K 9/00 |
| JP | 01148468 A | * 6/1989 | ............... B23K 9/08 |
| JP | 05154656 A | * 6/1993 | ............... B23K 9/10 |
| JP | 2000271747 A | * 10/2000 | ............... B23K 9/32 |
| JP | 2006247733 A | * 9/2006 | |
| WO | WO 8101382 A1 | * 5/1981 | ............... B23K 9/06 |

OTHER PUBLICATIONS

International Search Report and Written Opinion for International Application No. PCT/IB2013/000322, mailing date Aug. 1, 2013, 10 pages.

* cited by examiner

*Primary Examiner* — Tu B Hoang
*Assistant Examiner* — Alba Rosario-Aponte
(74) *Attorney, Agent, or Firm* — Perkins Coie LLP (57) ABSTRACT

A system and method of welding is provided where welding power supply has a first output electrically coupled to a welding electrode and a second output electrically coupled to a switching mechanism. The welding power supply provides a welding current through either of the first and second outputs to weld at least one work piece. The switching mechanism has at least a first and second switch position, where the first switch position is coupled to a first position on the at least one work piece and the second switch position is coupled to a second position on the at least one work piece, which is remote from the first position. During welding the switching mechanism switches between the first and second switch positions to change a current path for the welding current during through the at least one work piece.

21 Claims, 6 Drawing Sheets

WORK CURRENT SWITCHING TO ELIMINATE ARC BLOW

BACKGROUND OF THE INVENTION

1. Field of the Invention

Devices, systems, and methods consistent with the invention relate to welding, and more specifically related to work current switching to eliminate arc blow during welding.

2. Description of the Related Art

It is known that during welding a large current is passed from an electrode into a work piece to be welded, and this current can generate a relatively strong magnetic field. This magnetic field has a tendency to magnetize the work piece to be welded and/or the work piece fixtures. The magnetization of the work piece and/or the work piece fixture can cause the welding arc to deflect or bend from its ideal positioning which can tend to cause arc blow, or otherwise destabilize the welding arc. Furthermore, welding systems often use a single ground contact to the work piece. This creates a single current path through the work piece during welding. However, the use of a single current path throughout a welding operation can also cause arc instability and arc blow issues as the distance and orientation between the welding operation and the ground contact point changes. Moreover, it can be problematic to have a single current path through the work piece during welding as it can cause the welding arc to be biased to a single orientation during welding.

BRIEF SUMMARY OF THE INVENTION

An exemplary embodiment of the present invention is a welding system and method for welding having a welding power supply with a first output which is electrically coupled to a welding electrode and a second output which is electrically coupled to a switching mechanism. The welding power supply provides a welding current through either of the first and second outputs to weld at least one work piece with the welding electrode. The switching mechanism has at least a first and second switch position, where the first switch position can be coupled to a first position on the at least one work piece and the second switch position can be coupled to a second position on the at least one work piece, which is remote from the first position. During welding the switching mechanism switches between the first and second switch positions to change a current path for the welding current during through the at least one work piece.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1A:
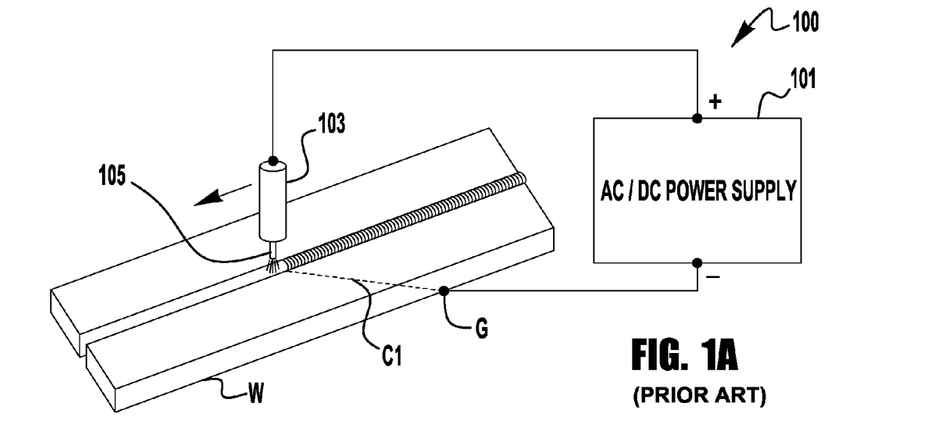
FIG. 1A-C illustrate a diagrammatical representation of a welding system and process with a single ground contact point.

FIG. 1A depicts a welding system 100 with a single ground contact point G on the work piece. This is a typical welding system configuration in which a single ground contact lead couples a welding power supply 101 to the work piece W. The other contact lead couples the power supply 101 to a welding torch 103 which provides a welding current to a welding electrode 105, which may or may not be consumable. Thus, the power supply 101, torch 103, electrode 105, work piece W and the connecting leads create a welding circuit through which welding current flows. Because these components make up a welding circuit it is known that the work piece W provides a current path from the welding electrode 105 to the ground point G (or vice versa in AC welding). Because of the nature of the operation this welding path is typically the shortest distance between the electrode 105 and the ground point G. This current path is depicted as C1. Because this current path is directed to a consistent side of the weld joint the current path C1 will tend to bias the welding arc towards the ground point G, which can cause arc instability issues.

It should be noted that although the term "work piece" is referenced in this application as opposed to the plural work pieces, this is not intended to be limited to a single work piece to be welded, as more often than not a plurality of work pieces are welded at a weld joint.

Figures 1B, 1C:
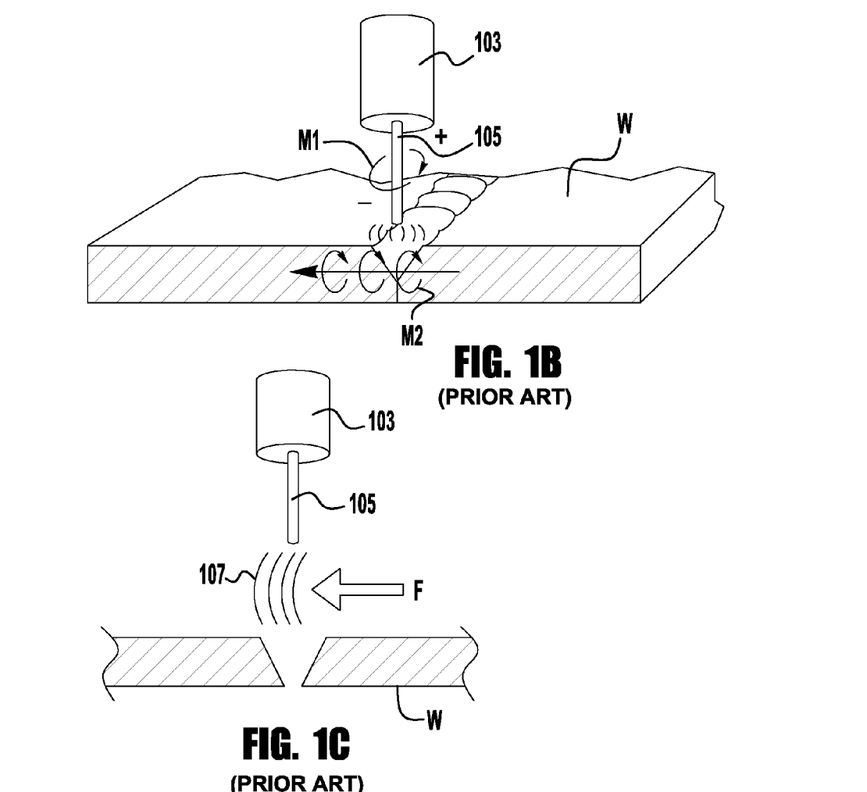

As explained above the flow of current through the work piece W can tend to magnetize the work piece W. This is shown in FIG. 1A which shows that a first magnetic field M1 and second magnetic field M2 are created because of the flow of current during welding. The magnetic fields M1 and M2 can magnetize the work piece and interact with each other to destabilize the welding arc and/or cause arc blow issues. This is depicted in FIG. 1C where a magnetic force F created by the magnetic fields can cause the welding arc 107 bend or bias to one side of a weld joint. When this occurs the arc can destabilize and adversely affect the weld quality. Furthermore, these issues can be exacerbated as the welding process moves away from the ground contact point G. Typically, the ground point G is chosen prior to welding and is not changed during a welding operation. Because of this, the current path C1 can change and/or elongate considerably during welding, which can change the overall welding circuit parameters, such as resistance, inductance, etc. Additionally, there can be magnetic fields that preexist in the work piece or fixtures used which can influence arc positioning and stability during welding. This is especially the case when all of the magnetic fields (generated and existing) interact with the arc during welding, as the various magnetic fields will have different magnitudes and directions at different areas on the work piece.

Figure 2:
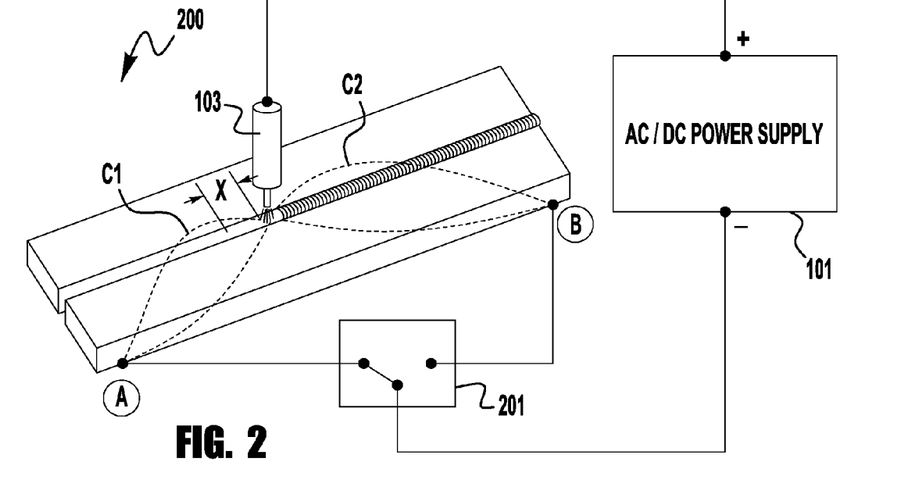
FIG. 2 illustrates a diagrammatical representation of a welding system in accordance with an exemplary embodiment of the present invention.

FIG. 2 depicts an exemplary system 200 of the present invention, where a ground switch 201 is coupled to at least two separate ground points A and B on the work piece W and to the welding power supply 101. The power supply 101 can be either a DC or AC welding power supply, as embodiments can be used with either type of power supply. Further, embodiments of the present invention are not limited by the type of welding operation being performed, which can include: MIG, TIG, FCAW, SAW, GMAW, cladding, etc. During welding the switch 201 changes the ground contact of the work piece between ground points A and B so that at least two different current paths C1 and C2 are created during welding.

At the beginning of the welding operation the switch 201 is selected to have a ground connection with either one of the two different ground points A or B. During welding, the switch then switches to the other of the ground points A or B to change the ground current path. This switching can be controlled a number of different ways. For example, in a first exemplary embodiment the switch 201 is switched after a certain travel distance X is traveled by the torch 103. In such an embodiment, a travel distance detection device (not shown) detects a distance traveled by the torch 103 and after the distance X is traveled the switch is switched to the other ground point. The switch 201 is then switched back after the distance X is traveled again. This switching is repeated as the welding operation proceeds. There are many different types of devices which can be used to track a travel distance. For example, a robotic welding system can determine the distance traveled by the welding torch 103 (or the work piece W if the work piece is moved) and then instruct the switch 201 to change the ground connection. Alternatively, the torch 103 can be equipped with a roller wheel which contacts the work piece W to track a distance traveled by the torch 103. In yet another embodiment, a welding carriage assembly which is carrying the torch can determine a distance traveled and provide that information to close the switch 201.

In a different exemplary embodiment of the present invention, the switch 201 changes the ground contact point after a determined amount of welding time T, or after a number N of welding pulses. In such embodiments the power supply 101 contains a timing circuit or pulse counting circuit (which are generally known to those in the field of welding power supplies) such that the power supply 101 instructs the switch 201 to switch after a determined amount of time T or after a number N of pulses have been counted. For example, in some exemplary embodiments the ground point will have a switch time T in the range of 0.5 to 20 mS.

In yet another exemplary embodiment of the present invention, the switch 201 can be instructed to switch after a determined amount of welding electrode 105 has been consumed. For example, an electrode feeding mechanism (not shown) can be equipped with a counter which monitors a length of electrode 105 provided to the weld joint and after a determined amount of electrode 105 has been consumed the switch 201 will be activated to change the ground contact. For example, a wire feeder mechanism can be equipped with a rotation counter on its wire feeding drive roller to monitor the number of rotations R of its drive roll. After a determined number of rotations (indicating a certain amount of electrode consumed) the switch 201 is activated to change the ground position.

In exemplary embodiments of the present invention, the duration that the current is directed to the respective each ground points A and B is the same, such that the amount of time the current is directed to point A is the same as that to point B. However, in other exemplary embodiments this may not be the case as it may not be necessary.

In further exemplary embodiments, the switch 201 is made integral to the welding power supply 101 and is coupled to the output terminal of the power supply 101 that is coupled—via a welding cable—to the work piece W. The switch can be controlled via any number of methods, including the internal control electronics of the power supply 101. These control electronics are generally known and need not be discussed in detail herein. The control electronics of the power supply 101 can have a counter circuit, timing circuit, or the like, which controls the switching of the switch 201 as desired during welding.

By switching the ground position between two different positions A and B the welding current will not travel through a single path through the work piece W. As a result there will be little or no resultant magnetization of the work piece during the welding operation. To the extent there is some magnetization, that magnetization will be counteracted by magnetization from current flowing in a different direction. Moreover, any magnetic forces F on the welding arc from a magnetic field will oscillate between at least two different directions and thus effectively result in cancellation of these forces. Through this cancellation effect the occurrences of arc blow will be reduced and arc stability will be improved.

As shown in FIG. 2, the different ground points A and B are positioned distant from each other on the work piece W. In exemplary embodiments of the present invention the ground points A and B should be positioned as remote from each other as feasible on the work piece. This ensures maximum deviation between current paths C1 and C2. If the current paths C1 and C2 are too close to each other this can diminish the effectiveness of embodiments of the present invention. This is particularly the case if the ground contact points are on the same side of the work piece W to be welded, relative to the weld joint. Exemplary ground point locations are depicted in FIG. 8.

Figure 8:
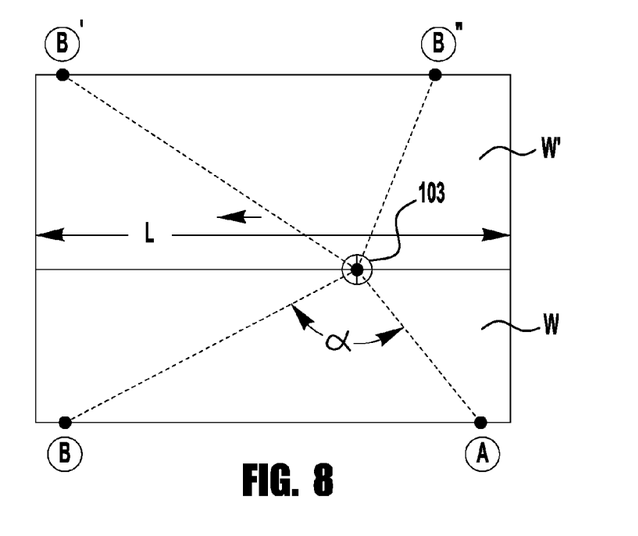
FIG. 8 is a diagrammatical representation of exemplary positioning of ground contacts with embodiments of the present invention.

As shown in FIG. 8 the ground points A and B can be located at multiple locations. For example, ground points A and B are shown at either end of the work piece W, but on the same side of the weld joint. However, the ground points can be located at other locations are not limited to this configuration. For example, the ground points A and B' can be located at opposite corners of the work pieces W and W' to be welded. Alternatively, the ground points A and B" can be located on opposite sides from a weld joint such that they are across from each other.

As shown in FIG. 8, an angle $\alpha$ is created between current paths from the torch 103 to the ground contact points A and B, B' or B". In some exemplary embodiments of the present invention, the angle $\alpha$ is maintained such that the angle is no less than 45 degrees during the entire length L of the weld joint created during a welding operation. This ensures sufficient angular differential between the ground current paths to the respective ground points. It is understood that as the welding operation progresses the angle $\alpha$ of the current paths will change as the torch 103 moves relative to the ground points A and B. However, in these embodiments as the angle changes it does not go below 45 degrees. In other exemplary embodiments, the angle $\alpha$ does not go below 60 degrees during welding. As a note, the angle α is to be measured between a first line which intersects the center of the welding arc during welding and a first ground contact point A and a second line which intersects the center of the welding arc and a second ground contact point B, B' or B". In some exemplary embodiments, it is not necessary to maintain the above stated angle α for the entire length L of the weld to be performed. That is, in some exemplary embodiments the above angle can be maintained above the desired threshold for at least 70% of the weld joint length L. In further exemplary embodiments of the present invention, to the extent the above angle is not maintained at or above 45 degrees for the full length L of the weld joint, the angle should be between 20 and 45 degrees for the remainder of the joint weld length.

It should be noted that the depiction of current flow as a single dashed line, in the figures of the present application, is intended to be an exemplary representation of a direction and orientation of current flow. It is, of course, understood that the flow current will not track a single line from one point to another, but rather flows over an area of the work piece which is generally in line with the lines depicted in the figures.

Figure 3:
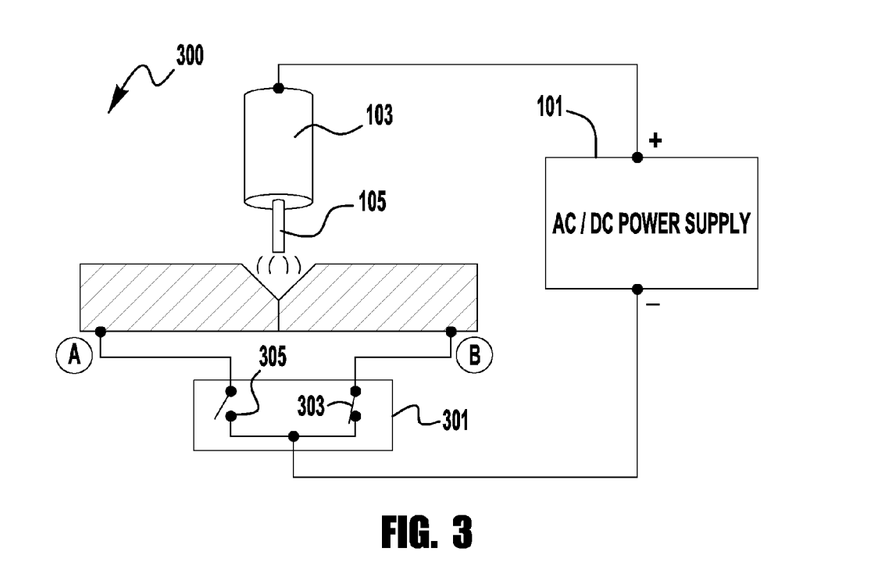
FIG. 3 illustrates a diagrammatical representation of a welding system in accordance with a further exemplary embodiment of the present invention.

FIG. 3 depicts another exemplary embodiment of the present invention. The system 300 shown in FIG. 3 also uses a switch circuit 301 to switch between at least two different ground points A and B. However, the switch circuit 301 is also capable of providing current from both ground points A and B to the power supply 101 at the same time. That is, the switch circuit 301 contains at least two switches 303 and 305 which can be closed alternatively (as discussed above with respect to FIG. 2) or at the same time. By closing the switches 303 and 305 at the same time the welding current will be split between the current ground paths. However, it is not necessarily the case that the current will be divided equally. The multiple current paths may aid in providing arc stabilization during welding. In such embodiments, during a first portion of welding one switch 303 is closed and the other is open, during a second portion both switches 303 and 305 are closed, and in a third portion only the second switch 305 is closed. The timing of such switching can be controlled as described above.

Figure 4:
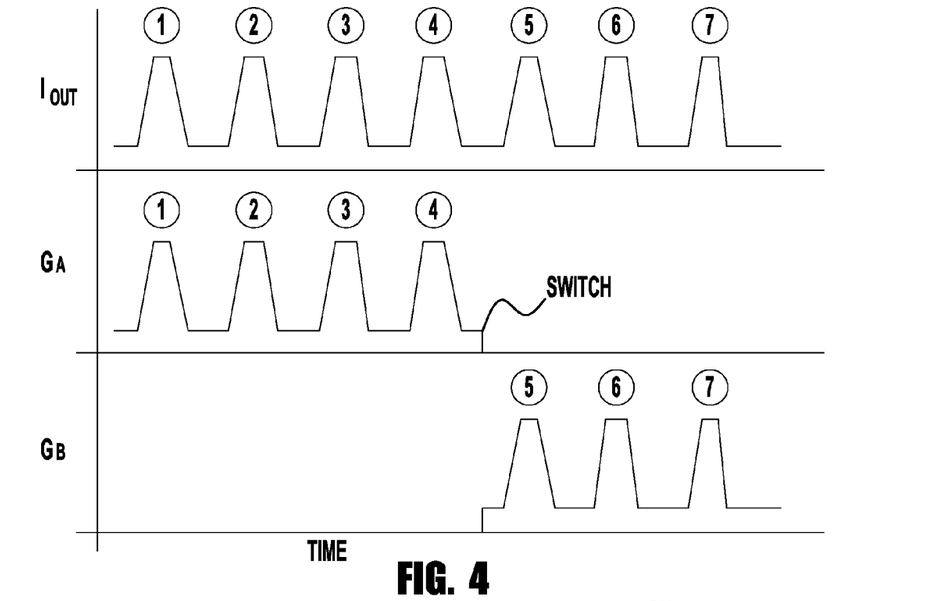
FIG. 4 illustrates a diagrammatical representation of a welding waveform used with an embodiment of the present invention.

FIG. 4 depicts an exemplary welding waveform which can be used in embodiments of the present invention. The output current $I_{out}$ of the power supply 101 is shown having a pulse type waveform with a plurality of welding pulses 1 through 7. During the welding with pulses 1 through 4 the current passes to a first ground point A on the work pieces. Then, during the background current between pulses 4 and 5 the ground switch 101 or 301 switches to couple the second ground point B to the power supply 101 for pulses 5 through 7. In exemplary embodiments of the present invention, the switching of ground points occurs during a point in the welding waveform which minimizes impact on the welding process. For example, as shown in FIG. 4, the switching occurs during the background current of the welding waveform. This will minimize any impact on the welding operation. In other exemplary embodiments the ground path can be switched at any time asynchronously with the welding waveform. For example, in embodiments in which a pulse-type waveform is used the switching can be done asynchronously to the pulsing waveform. In other exemplary embodiments which use an AC welding waveform, the switching can occur at any time within the waveform, and in some embodiments the switch is controlled such that it does switch ground paths at the same time the AC current is switched.

Figure 5:
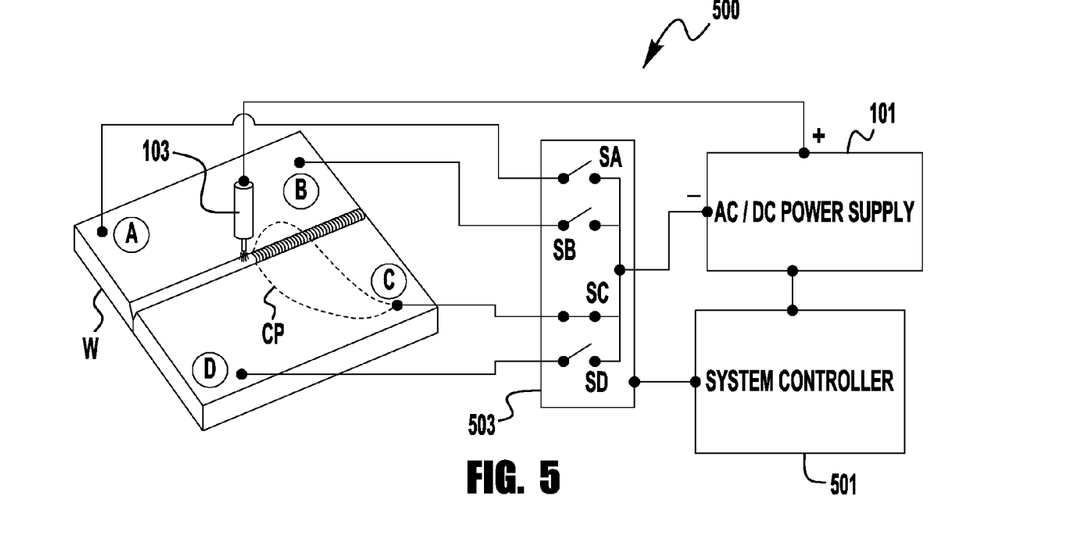
FIG. 5 illustrates a diagrammatical representation of a welding system in accordance with an additional exemplary embodiment of the present invention.

FIG. 5 depicts another exemplary welding system 500 of the present invention. Like the other systems discussed, the system 500 includes a power supply 101 coupled to a torch 103 to weld a work piece W. Also included are a switching circuit 503 and a system controller 501, containing a CPU type device. In the embodiment shown, the work piece W has more than two ground points and, in the embodiment shown, has four ground points A, B, C, D. The switching circuit 503 comprises a plurality of switches SA, SB, SC, and SD which couples each of the ground points, respectively, to the power supply 101. The operation of this system 500 is similar to that described above, except rather than using two ground points four ground points are used. In this embodiment, the current path CP can be switched to any of the four different ground points A, B, C, or D as desired. The control of the switching is provided by a system controller 501 (which can be integral to the power supply) which controls the switching as described above (based on timing, pulses, etc.). Furthermore, the system controller 501 can close more than one switch at a time. For example, in a first portion of the weld switches A and C can be closed and in a second portion switches B and D can be closed. The combination of ground paths can be created as desired. Alternatively, during a first portion of the welding process the ground path can be switched between points B and C, and then in a second portion of the welding process the ground path can be switched between A and D.

In yet a further embodiment of the present invention, the switches can be closed and opened sequentially in a clockwise or counterclockwise pattern so as to move the welding arc in a generally rotational pattern. That is, as the current path changes to different ground points in a rotational pattern this can have a tendency to bias the welding arc in a rotational pattern because of the magnetic and electrical forces acting on the arc. By switching the ground points in a rotational pattern the arc can be moved to emulate a rotational pattern, or any other pattern as desired, which can enhance the weld quality.

In a further exemplary embodiment of the present invention, the switches SA, SB, SC and SD are closed in a random pattern. To the extent a random pattern is used, however, it may not be desirable to have the current path remain to a single ground point for an extended period of time. Therefore, in some exemplary embodiments using a random switching, the switching should be such that no switch SA, SB, SC or SD is closed for more than 0.5 to 20 mS.

The system controller 501 can use various means to control the switching circuit 503, including timing circuits, counter circuits, wire feeder feedback, feedback from a robotic welding cell, etc. This information is then used by the system controller to control the switching of the switching circuit 503.

It is also noted that embodiments of the present invention are not limited to the use of two or four ground contact points as depicted in the figures herein. Embodiments of the present invention can use two or more contact points as desired.

Figure 6:
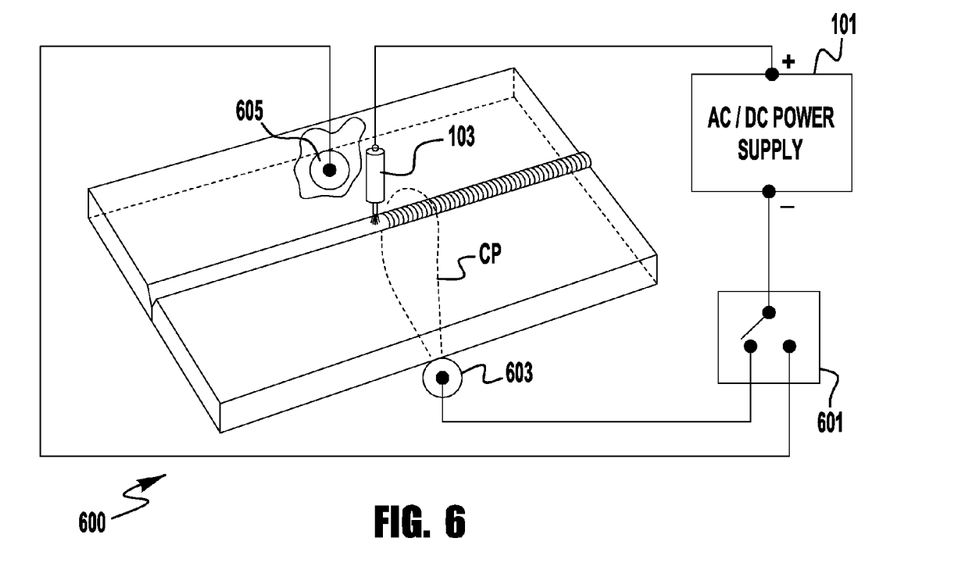
FIG. 6 illustrates a diagrammatical representation of a welding system in accordance with another exemplary embodiment of the present invention.

FIG. 6 depicts a further exemplary embodiment of the present invention, where the system 600 has ground contact points A and B which remain equidistant from the torch 103 during welding. As shown, the switch 601 is coupled to contact rollers 603 and 605 which are conductive and movable with respect to the work piece W. This allows the contact points A and B to move, relative to the work piece W, during welding. The rollers can be fixed to a welding carriage device (not shown) or can be fixed to a welding cell work surface on which the work piece is placed during welding. As the work piece is welded either the work piece W or the welding carriage is moved. But, the conductive rollers 603/605 allow the ground contact points A and B to move relative to the work piece W such that the distances and angling between the torch 103 and points A and B do not change during welding. This configuration provides an added benefit that the overall resistance of the welding circuit will not significantly change during welding. Of course, other embodiments of the present invention can use different types of ground contacts than the depicted rollers 603/605. For example, conductive contact brushes or biased members can be used which maintain electrical contact and allow travel along the work piece surface during welding.

Figure 7A:
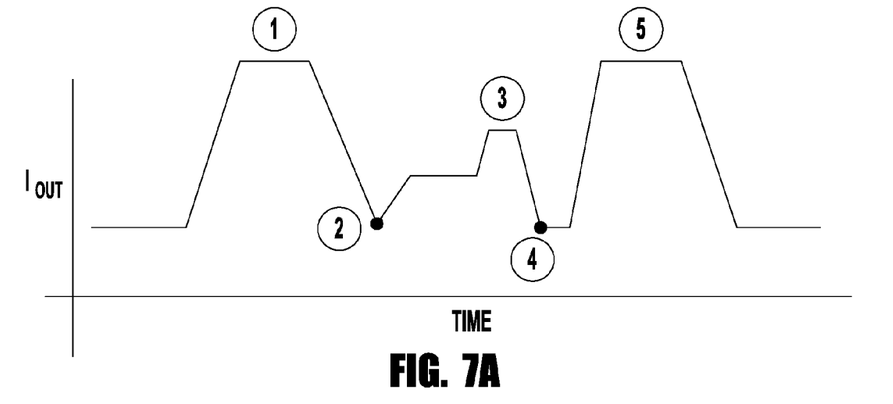
FIGS. 7A and B illustrate a diagrammatical representation of a welding waveform and system in accordance with an exemplary embodiment of the present invention.
Figure 7B:
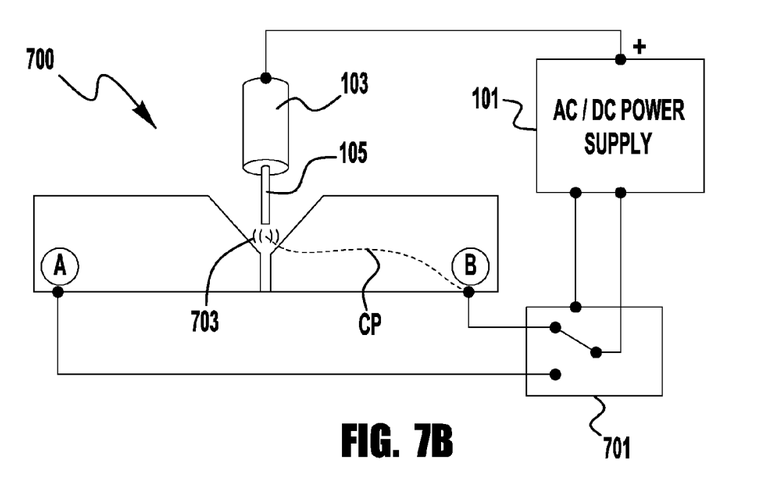

FIGS. 7A and 7B depict another exemplary embodiment of the present invention where the system 700 is employed to aid in clearing a short circuit during welding. It is known that during welding short circuits can occur where the welding electrode 105 makes contact with the work piece W. As shown in FIG. 7B, this contact can be made with one side of a weld joint, at point 703. In an embodiment of the present invention, the power supply 101 detects the short circuit (through known detection means) and causes the switch 701 to change the ground point (from B to A). By changing the ground point, the change in current path CP will aid in biasing the welding arc and molten portions of the electrode 105 away from the work piece W to which the electrode 105 is short circuited. This bias can aid in clearing the short circuit faster. Furthermore, this bias can aid in clearing the short circuit with less energy input into the welding arc. For example, it may not be necessary to have a significant increase in current to "burn back" the electrode to clear the short. In exemplary embodiments, this method of control can also be used when starting an arc welding process on gapped work pieces where the arc is first initiated on one side (e.g., side B) and then transferred to the other side (e.g., side A) to aid in bridging the gap. Once the gap is bridged the ground switching is used to control arc blow as described above.

FIG. 7A depicts an exemplary welding waveform in which a short circuit has occurred during welding. At point 1 the welding pulse is a peak level for droplet transfer. At exemplary point 2 a short circuit is detected by the power supply 101. This can be done in any number of ways, including monitoring the arc current, arc voltage, or through use of a premonition circuit, etc. After detection of the short circuit the power supply 101 causes the switch 701 to open the connection between the power supply and the current ground contact point B and close the connection between the power supply 101 and the other ground contact point A. In addition to changing the switch 701, the power supply 101 can implement a short clearing operation, such as using a short clearing pulse 3. During the short clearing pulse 3 the current is directed to the other ground point A such that when the arc reignites (during clearing of the short) the arc will have a tendency to be biased away from the short 703. After the clearing of the short the current is dropped back to background level 4 prior to beginning another welding pulse 5. When the power supply 101 determines that the short 703 is cleared (for example, when the current reaches the background level 4) the power supply causes the switch 701 to revert back to being closed with respect to the ground point prior to the short (point B in FIG. 7B). In other exemplary embodiments, the switch 701 remains in the short clearing position for a duration after the short is cleared to ensure that a new short is not created. For example, the switch 701 can remain in the short clearing position for a duration T or a number N of pulses to ensure that the short is cleared and is not re-established. The duration T or number N can be pre-determined prior to welding.

In another embodiment, the power supply 701 switches the switch 701 when an arc instability condition is detected by the power supply 101. For example, if a short circuit premonition circuit determines that a short circuit is imminent then the power supply 101 can cause the switch 701 to change the ground point prior to the beginning of a short circuit. Thus, the switch 701 can change the ground point even before a short circuit event occurs. In another embodiment, the power supply 101 monitors the rate of change of the arc current and if the rate of change exceeds (or is below) a threshold level or range, it could be an indication of arc instability. Upon detection of this instability the power supply 101 changes the switch 701 as described above.

Figure 9:
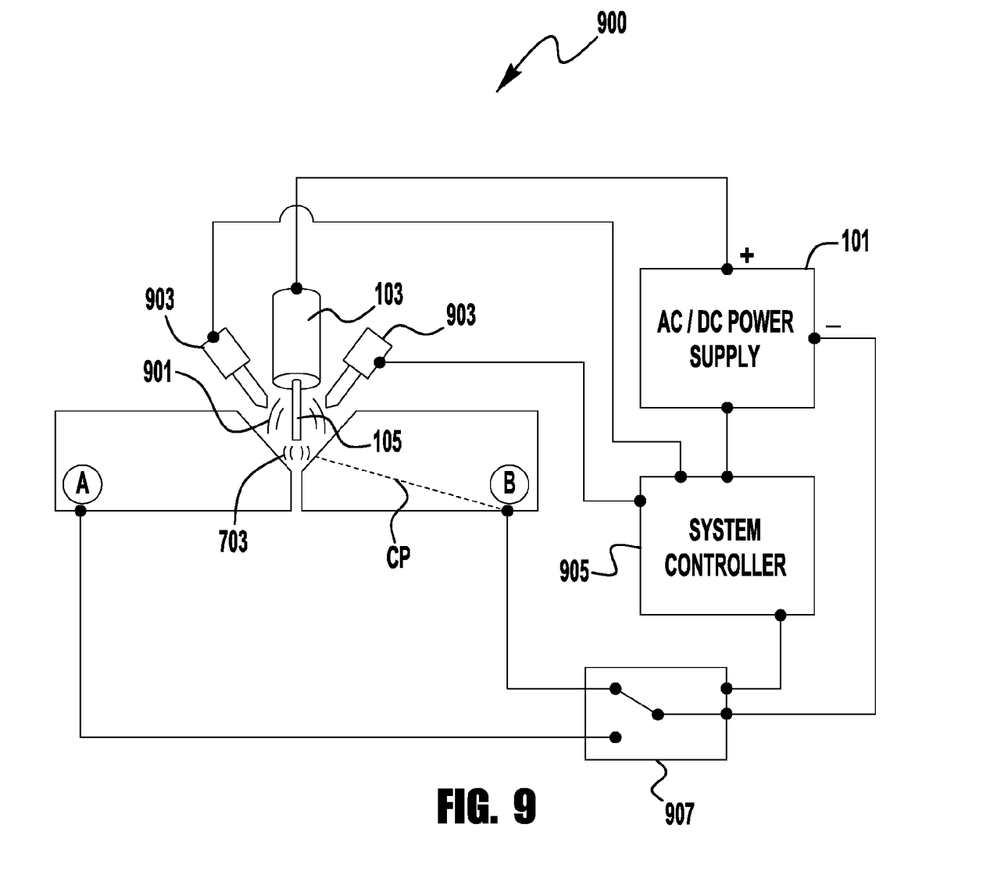
FIG. 9 is a diagrammatical representation of another exemplary welding system in accordance with embodiments of the present invention.

FIG. 9 depicts another exemplary embodiment of a welding system 900 in accordance with the present invention. This embodiment operates similar to the embodiments described herein, but includes at least one magnetic field sensor 903 which is positioned adjacent to the welding operation to sense a magnitude of the magnetic field 901 created during welding. The sensor(s) 903 is coupled to a system controller 905 (which can be internal to the power supply 101) which uses the sensed magnetic field strength to determine if the switch 907 is to be operated. For example, if the detected strength of the magnetic field 901 exceeds a threshold value the system controller 905 controls the switch 907 to change the ground point. The system controller 905 can be any type of CPU type device which is capable of receiving feedback from the sensor (s) 903 and controlling an operation of the switch 907 based on that detected magnetic field strength. In an exemplary embodiment, during operation the system controller 905 determines and/or sets a magnetic field strength threshold level which is compared to the detected strength of the magnetic field 901. When the detected field strength exceeds the threshold value the controller 905 causes the switch 907 to change the ground point. Such a system would prevent the build up of a magnetic field strength which would adversely affect the welding operation. In the embodiment shown, two sensors 903 are utilized and are positioned on either side of the weld joint. In such an embodiment, the respective sensors 903 measure the magnetic field strength on their respective sides of the weld joint and control the switch 907 based on that detected field strength. For example, if the field strength on one side of the weld joint exceeds a threshold level, the switch 907 is changed to prevent further build up of the magnetic field. In exemplary embodiments of the present invention, the threshold value for the magnetic field strength is determined based on at least the magnitude of the welding current from the power supply 101. In some embodiments, the system controller 905 can use a state table or a look-up table which determines the threshold magnetic field strength based on the welding current being provided by the power supply 101, and thus can be a changing threshold value during the welding process. In other embodiments, the threshold value can be fixed and based on a peak current setting for the welding operation which can be fixed based on a user input current setting prior to welding. In other exemplary embodiments, the magnetic field threshold value can also be determined based on the material type of the work piece to be welded (e.g., mild steel, stainless steel, aluminum). In other exemplary embodiments, a magnetic field constant can also be input into the system controller 905 prior to welding. A magnetic field constant can be a user generated constant which takes into account the magnetism of any welding fixtures or welding environment that may be used. It is known, that the fixtures and/or welding environment can affect the magnetic fields created during welding. Thus, the system controller 905 allows a user to input a magnetic field constant to be factored in the determination of the magnetic field strength threshold value for the controller 905.

In other exemplary embodiments of the present invention, a system can be used which monitors audio interference with the arc, or arc light conditions which are detrimental to arc stability and the ground point can be switched based on the detected audio or arc light conditions similar to what is described above.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. An arc welding system, comprising:
    a welding power supply having a first output which is electrically coupled to a welding electrode and a second output which is electrically coupled to a switching mechanism, and where said welding power supply provides a welding current through either of said first and second outputs to weld at least one work piece with said welding electrode,
    a magnetic field sensor which senses a magnetic field near said welding electrode during welding, and
    wherein said switching mechanism has at least a first and second switch position, where said first switch position is coupled to a first position on said at least one work piece and said second switch position is coupled to a second position on said at least one work piece, which is remote from said first position,
    wherein during welding said switching mechanism switches between said first and second switch positions to change a current path for said welding current through said at least one work piece based on said detected magnetic field,
    wherein said welding current is a pulse welding current comprising a plurality of current pulse portions and said switching mechanism switches between said first and second switch positions between said current pulse portions.

2. The welding system of claim 1, wherein said switching mechanism has a third switch position where said second output of said power supply is electrically coupled to each of said first and second positions on said at least one work piece at the same time, and said switching mechanism switches between at least one of said first and second switch positions and said third switch position.

3. The welding system of claim 1, wherein said first and second positions are located on opposite portions of said at least one work piece.

4. The welding system of claim 1, wherein said switching mechanism further comprises at least a third and fourth switch position which are coupled to a third and fourth position on said work piece, respectively, and during welding said switching mechanism switches between a first pair of said first, second, third and fourth switch positions and a second pair of said first, second, third and fourth switch positions.

5. The welding system of claim 1, wherein said switching mechanism switches between said first and second switch position during a short circuit between said welding electrode and said at least one work piece.

6. The welding system of claim 1, wherein said switching mechanism switches between said first and second switch positions every 0.5 to 20 mS.

7. The welding system of claim 1, wherein said welding current is a pulse welding current comprising a plurality of current pulse portions and said switching mechanism switches between said first and second switch positions after a predetermined number of pulses.

8. The welding system of claim 1, wherein said first and second positions remain fixed relative to said welding electrode during said welding.

9. A method of arc welding, said method comprising:
    outputting a welding current from a welding power supply through either of a first output which is electrically coupled to a welding electrode and a second output which is electrically coupled to a switching mechanism, and where said welding current is used to weld at least one work piece,
    sensing a magnetic field near said welding electrode during welding,
    switching said switching mechanism between a first and second switch position during said outputting of said welding current based on said detected magnetic field, where said first switch position is coupled to a first position on said at least one work piece and said second switch position is coupled to a second position on said at least one work piece, which is remote from said first position, such that a current path for said welding current is changed during welding, and
    wherein said welding current is a pulse welding current comprising a plurality of current pulse portions and said switching mechanism switches between said first and second switch positions between said current pulse portions.

10. The method of claim 9, further comprising switching said switching mechanism to a third switch position where said second output of said power supply is electrically coupled to each of said first and second positions on said at least one work piece at the same time, and said switching mechanism switches between at least one of said first and second switch positions and said third switch position during welding.

11. The method of claim 9, wherein said first and second positions are located on opposite portions of said at least one work piece.

12. The method of claim 9, further comprising switching coupling at least a third and fourth switch position of said switching mechanism to a third and fourth position on said work piece, respectively, and during welding switching between a first pair of said first, second, third and fourth switch positions and a second pair of said first, second, third and fourth switch positions.

13. The method of claim 9, further comprising switching between said first and second switch positions during a short circuit between said welding electrode and said at least one work piece.

14. The method of claim 9, further comprising switching between said first and second switch positions every 0.5 to 20 mS.

15. The method of claim 9, wherein said welding current is a pulse welding current comprising a plurality of current pulse portions and said switching between said first and second switch positions occurs after a predetermined number of pulses.

16. The method of claim 9, wherein said first and second positions remain fixed relative to said welding electrode during said welding.

17. The welding system of claim 1, wherein said second position on said at least one work piece is spaced apart from said first position on said at least one work piece and wherein said switching mechanism switches between said first and said second switching positions such that said current path uses said first position on said at least one work piece when said switching mechanism is switched to said first switch position and said current path uses said second position on said at least one work piece when said switching mechanism is switched to said second switch position.

18. The method of claim 9, wherein said second position on said at least one work piece is spaced apart from said first position on said at least one work piece and wherein said switching mechanism switches between said first and said second switching positions such that said current path uses said first position on said at least one work piece when said switching mechanism is switched to said first switch position and said current path uses said second position on said at least one work piece when said switching mechanism is switched to said second switch position.

19. An arc welding system, comprising:
   a welding power supply having a first output which is electrically coupled to a welding electrode and a second output which is electrically coupled to a switching mechanism, and where said welding power supply provides a welding current through either of said first and second outputs to weld at least one work piece with said welding electrode,
   a device for detecting a distance traveled by said welding electrode during welding, and
   wherein said switching mechanism has at least a first and second switch position, where said first switch position is coupled to a first position on said at least one work piece and said second switch position is coupled to a second position on said at least one work piece, which is remote from said first position,
   wherein during welding said switching mechanism switches between said first and second switch positions to change a current path for said welding current through said at least one work piece based on said detected distance traveled of said welding electrode,
   wherein said welding current is a pulse welding current comprising a plurality of current pulse portions and said switching mechanism switches between said first and second switch positions between said current pulse portions.

20. The welding system of claim 19, wherein at least one of the first and second positions are movable relative to said at least one workpiece during said welding.

21. An arc welding system, comprising:
   a welding power supply having a first output which is electrically coupled to a welding electrode and a second output which is electrically coupled to a switching mechanism, and where said welding power supply provides a welding current through either of said first and second outputs to weld at least one work piece with said welding electrode,
   a device for determining an amount of said welding electrode consumed during welding, and
   wherein said switching mechanism has at least a first and second switch position, where said first switch position is coupled to a first position on said at least one work piece and said second switch position is coupled to a second position on said at least one work piece, which is remote from said first position,
   wherein during welding said switching mechanism switches between said first and second switch positions to change a current path for said welding current through said at least one work piece based on said amount of said welding electrode consumed,
   wherein said welding current is a pulse welding current comprising a plurality of current pulse portions and said switching mechanism switches between said first and second switch positions between said current pulse portions.

* * * * *